2,943,981
THYROTROPHIN DERIVATIVES AND METHODS FOR USING SAME

Martin Sonenberg, New York, N.Y., assignor to Research Corporation, New York, N.Y., a corporation of New York No Drawing. Filed Feb. 18, 1957, Ser. No. 640,609

4 Claims. (Cl. 167—74)

This invention relates to novel derivatives of pituitary hormones and particularly to acetyl and phenylureido derivatives of pituitary thyrotrophic hormones, which have been found to be useful as inhibitors of the hormone action of the unmodified hormones whether of exogenous or endogenous origin.

The novel hormone derivatives of the invention may be made by treating pituitary thyrotropic hormone preparation with acetic anhydride to acetylate all or substantially all of the amino groups of the hormone or with phenylisocyanate to convert all or substantially all of the amino groups of the hormone to phenylureido groups.

The inhibitory action of the derivatives of the invention may be assayed by comparing the thyroid weights or concentration of radioactive iodine of test animals when injected with thyrotrophic hormone preparations alone and in combination with the derivatives of the invention. The latter derivatives may also be administered alone in order to assess the inhibitory action on endogenous thyrotrophic hormone action.

When the derivatives of the invention are injected into human beings substantial inhibition of thyroid function is obtained. The derivatives are also useful as diagnostic aids by making possible the blocking of the action of normal thyrotrophin without the toxicity attendant on the use of known thyroid inhibiting agents.

The acetyl derivatives of the hormone appear to be particularly advantageous.

The following specific examples are illustrative of effective methods of making the novel hormone derivatives of the invention.

*Acetylthyrotrophin.*—Two grams of pituitary thyrotrophin preparation is dissolved in 200 ml. of acetic anhydride at 0° C. and the mixture is stirred constantly for three hours. After this time the acetic anhydride is decomposed by the addition of 100 ml. of distilled water. The diluted reaction mixture is transferred to cellophane tubing and dialysed against running tap water for five days. The dialysate in the tubing is freeze dried giving approximately 1.8 grams of a tan powder.

In a typical preparation, the original hormone material had 0.96% aliphatic amino groups and 1.29% volatile acid (acetyl) groups. After acetylation by the foregoing method, the content of amino groups was reduced to zero and the acetyl groups were increased to 3.74%. There is no decrease in the total nitrogen content of the material.

The acetylated thyrotrophin may be injected in the form of a solution in isotonic saline solution. The injection of 50 to 100 mg. (of the dry material) intramuscularly daily for a period of eight days to two weeks has been found to result in substantial decrease in thyroid function in patients affected with thyroid cancer and with with Graves' disease or hyperthyroidism. There is a decrease in the protein-bound iodine of the blood which is a measure of secreted thyroid hormone and a very substantial decrease in the 48-hour radio-iodine uptake.

*Phenylureidothyrotrophin.*— One gram of pituitary thyrotrophin preparation is dissolved in a solution containing 125 ml. of isotonic saline solution and 125 ml. of 0.2 M phosphate buffer of pH 8.0 5 ml. of phenyl isocyanate are added to the solution over one hour with constant stirring, the reaction being maintained at pH 9.5 by the addition of dilute NaOH. The mixture is transferred to "Visking" dialysis tubing and dialysed against running tap water for ten days. The dialysed material is freeze-dried resulting in a salt-free white preparation.

I claim:

1. A thyrotrophin inhibiting preparation comprising pituitary thyrotrophin having substantially all the amino groups thereof converted to a member of the group consisting of acetylamino and phenylureido.

2. A thyrotrophin inhibiting preparation comprising pituitary thyrotrophin having substantially all the amino groups thereof converted to acetylamino.

3. A method of inhibiting the thyroid stimulating action of pituitary thyrotrophic hormone which comprises administering pituitary thyrotrophin having substantially all the amino groups thereof converted to a member of the group consisting of acetylamino and phenylureido.

4. A method of inhibiting the thyroid stimulating action of pituitary thyrotrophic hormone which comprises administering pituitary thyrotrophin having substantially all the amino groups thereof converted to acetylamino.

References Cited in the file of this patent

Pincus: The Hormones, vol. II, 1950, pp. 343 and 344, Academic Press, N.Y.C.